June 4, 1929.  M. L. PLUMMER  1,716,182
ELECTRIC MOTOR
Filed May 19, 1926   2 Sheets-Sheet 1

Mearl L. Plummer
INVENTOR
BY Victor J. Evans
ATTORNEY

WITNESS:

June 4, 1929.                M. L. PLUMMER                1,716,182
                              ELECTRIC MOTOR
                            Filed May 19, 1926           2 Sheets-Sheet 2
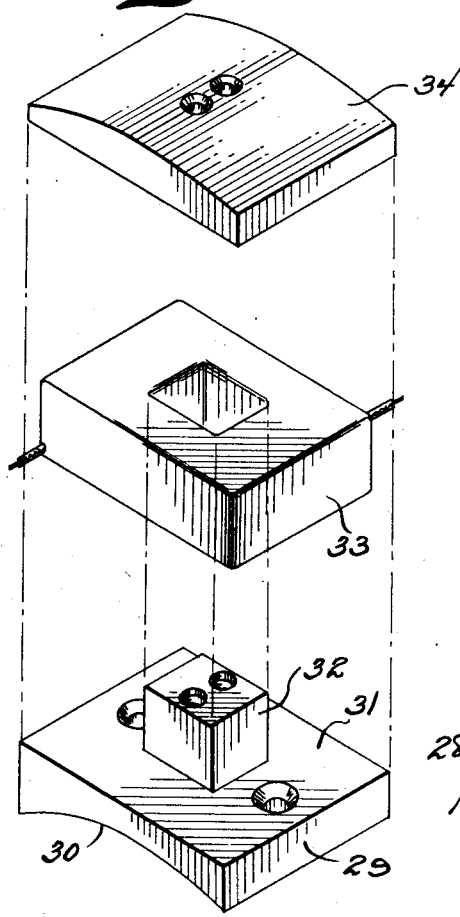
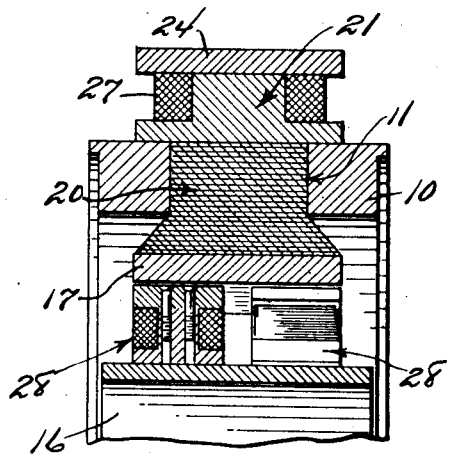
Mearl L. Plummer
INVENTOR
BY Victor J. Evans
ATTORNEY
WITNESS Patented June 4, 1929.

1,716,182

UNITED STATES PATENT OFFICE.

MEARL LOCHERN PLUMMER, OF JOHNSTOWN, PENNSYLVANIA.

ELECTRIC MOTOR.

Application filed May 19, 1926. Serial No. 110,273.

This invention relates to electric power apparatus, particularly to motors, and has for its object the provision of a novel motor so constructed and arranged that the field and rotor or armature coils and associated parts may all be quickly and easily removed and replaced in case of necessity, it being therefore not required that all the wiring be removed and the motor be rewound, as is the case with the ordinary type.

An important and more specific object is the provision of an electric motor in which the field elements are bodily removable without interfering with the rotor and in which the coils of the rotor may likewise be removed without interfering with any of the field coils, repairing being consequently an extremely easy matter.

An additional object is the provision of a motor which will be simple and inexpensive in manufacture, easy to assemble or disassemble, positive in action, efficient and durable in service, and a general improvement in the art.

With the above and other objects and advantages in view, the invention consists in the details of construction, and the arrangement and combination of elements to be hereinafter more fully described and claimed, and illustrated in the accompanying drawings, in which:—

Figure 3 is a detail perspective view showing the different elements of one of the rotor coils, disassembled, and Figure 4 is a detail section taken on the line 4—4 of Figure 1.

Figure 1:
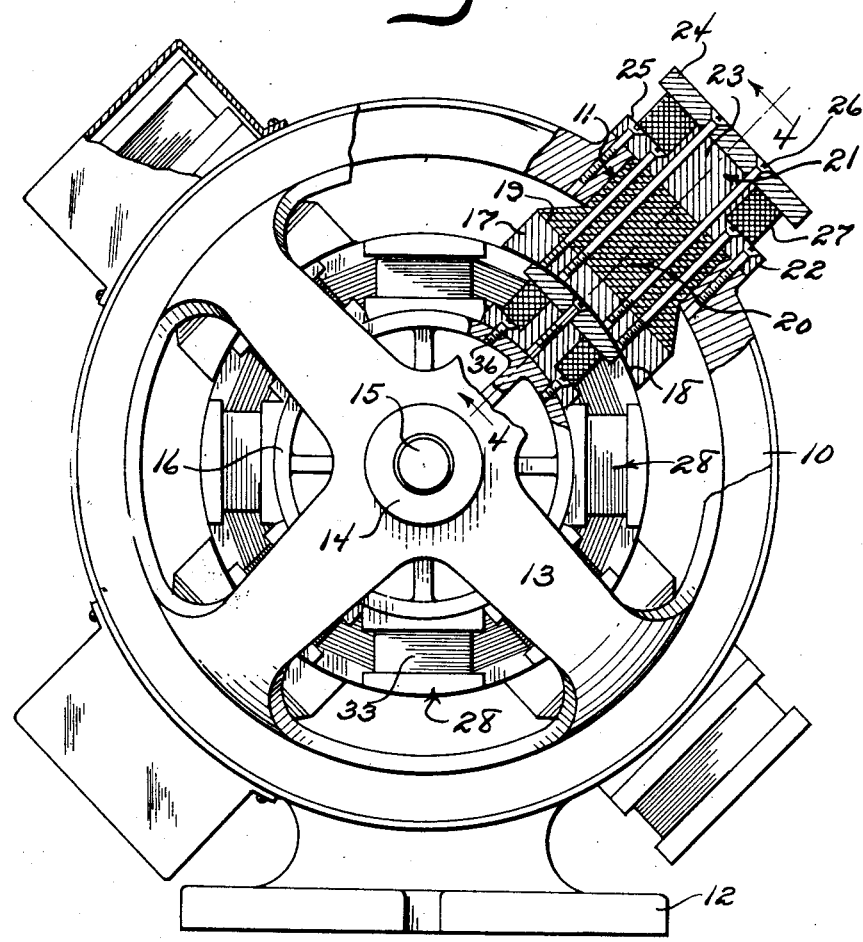
Figure 1 is an end elevation of a motor embodying the invention, parts thereof being broken away and in section.
Figure 2:
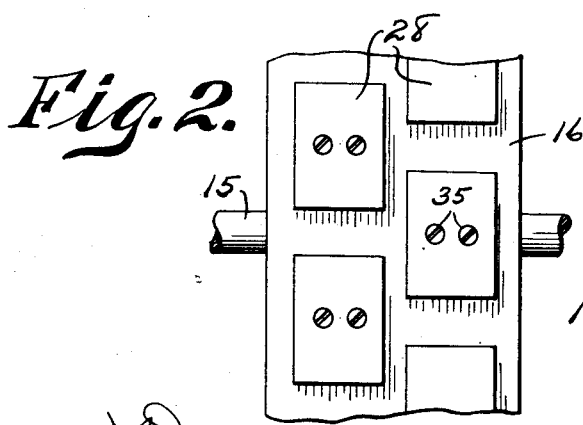
Figure 2 is a fragmentary plan or edge view of the rotor.

Referring more particularly to the drawings, I have shown the motor as comprising a stator frame 10 of circular form and provided at spaced intervals with radial openings 11. This frame or stator member may have any suitable base 12 by means of which it may be mounted upon any preferred support. Obviously, the opposite ends or sides of the stator should be of spider-like construction illustrated at 13, the spiders having bearings 14 at their centers for the shaft 15 which necessarily carries the usual commutator not shown, and which also carries the rotor 16 which is likewise of cylindrical shape and which operates within the confines of the stator or outer frame member 10.

The field element consists of block-like members or shoes 17 having concaved active faces 18 and flat outer faces 19 against which are disposed the innermost ones of groups of plates or laminations 20 which are fitted within the openings 11. Located outwardly of the stator or frame member 10 and associated with each group of plates or laminations is a spool-like member 21 including a plate 22 formed with a reduced extension 23 against which is secured, an outer plate member 24. The entire assembly of the field coil structure comprised by the parts 17 to 24 is mounted upon the stator or member 10 by suitable bolts 25, and the parts are held in assembled relation by other bolts 26. Each spool member 21 carries a suitable coil 27. Obviously, all these parts may be readily disassembled whenever such is necessary as for instance when making repairs to the wiring or when replacing a worn out, burnt out or broken unit.

The rotor 16 carries suitable number of metal spool-like members 28, each of which includes a plate-like member 29 having a concaved inner face 30 for conforming engagement upon the periphery of the rotor, and each of which further has a flat face 31 from which rises a reduced extension 32 on which is removably mounted a coil 33 held in place by a plate member 34, securing of the parts together being effected by means of suitable screws 35 which pass through holes in the members 34 and threaded openings or recesses in the extension 32. The assembled spool members or coil structures of the rotor are secured in place upon the rotor by means of suitable screws 36.

Of course it is intended that the convexed outer surfaces of the plate members 34 be concentric to the concave end surfaces of the shoe members 19 and spaced very slightly therefrom in order to reduce the air gap between the pole pieces of the fields and the pole pieces of the rotor coil so that the motor will have the proper efficiency.

From the foregoing description and a study of the drawings, it will be readily apparent that I have thus provided a simply constructed and inexpensive motor in which all the coils employed may be individually removed without disturbing any of the others, this being of great advantage in case it is necessary to make any repairs or replacement of a burnt out coil or one in which there is a break in the wire from any cause No special tools are needed it being quite clear that a screw driver will be sufficient to remove the various nuts or bolts which hold the various parts assembled. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In an electric motor, a stator having a plurality of openings arranged at spaced intervals in its periphery, a field structure including groups of laminations extending through said openings, shoe members located at the inner ends of the groups, spool-like members located exteriorly of the stator and carrying removably mounted coils, and means for holding the assembly together and securing the same upon the stator.

2. In an electric motor, an armature, a stator surrounding the armature and provided at spaced points with openings, a pole piece located within each opening and formed as a plurality of laminations, a core member on the exterior of the stator at each opening and projecting beyond the same, securing means passing through the core member and into the stator, a pole piece located at the inner end of the series of laminations, securing members passing through the core member, the laminations and said pole piece, a plate located at the outer end of the core member, securing elements passing through the plate, the core, the laminations and into the pole piece and a coil mounted upon the pole piece.

In testimony whereof I affix my signature.

MEARL LOCHERN PLUMMER.